United States Patent
Whipple

[11] Patent Number: 5,980,073
[45] Date of Patent: Nov. 9, 1999

[54] BOAT TRAILER LIGHTING SYSTEM

[76] Inventor: William F. Whipple, 966 Wages Way, Orlando, Fla. 32825

[21] Appl. No.: 09/174,289

[22] Filed: Oct. 16, 1998

[51] Int. Cl.$^6$ .................................................... B60Q 1/26
[52] U.S. Cl. ............................ 362/485; 362/269; 362/477
[58] Field of Search .................................. 362/269, 282, 362/287, 285, 418, 427, 477, 485, 523, 549; 114/66, 343; 340/985

[56] References Cited

U.S. PATENT DOCUMENTS

| | | |
|---|---|---|
| 3,080,581 | 3/1963 | Smihal ..................................... 362/285 |
| 3,870,875 | 3/1975 | Altimus . |
| 3,885,146 | 5/1975 | Whitley, Jr. . |
| 4,286,309 | 8/1981 | Rasinski . |
| 4,993,978 | 2/1991 | Johannes . |
| 5,137,481 | 8/1992 | Wengler . |
| 5,157,591 | 10/1992 | Chudzik . |
| 5,613,886 | 3/1997 | Cribbs . |

*Primary Examiner*—Y. Quach
*Attorney, Agent, or Firm*—William M. Hobby, III

[57] ABSTRACT

A boat trailer lighting system apparatus includes a boat trailer for trailering a boat having an outboard motor mounted thereto. An electrical light assembly having an electric lamp therein is rotatably attached to an outboard motor skeg mounting bracket which is removably attached to the outboard motor skeg. The electrical light assembly is connected through an electrical conductor to an electrical power source which may be connected into the tail and brake lights of the trailer so that the light is activated along with the trailer lights. The outboard motor skeg mounting bracket has a cover sleeve of a general shape of the outboard motor skeg for sliding over the skeg and a threaded clamping bolt threaded through the cover against the skeg to lock the skeg light to the outboard motor.

6 Claims, 2 Drawing Sheets

BOAT TRAILER LIGHTING SYSTEM

BACKGROUND OF THE INVENTION

The present invention relates to a boat trailer lighting system and especially to a light mounted to the skeg of an outboard motor attached to a boat being towed on a trailer.

An outboard motor boat is generally transported over land on trailers pulled by motor vehicles. The boats being hauled on the trailers typically have their outboard motors mounted to the transom of the boat. The boat trailers have rear safety lights which are connected to the motor vehicle tail lights and brake lights and are actuated whenever the vehicles tail lights or brake lights are actuated. The tail lights on boat trailers are generally placed at a relatively low level above the road surface and the boats are loaded to the trailers to extend well past the rear of the trailer such that the trailer lights are sometimes difficult to see by a driver in a vehicle following the trailer. Drivers who are following a boat and trailer being pulled by a vehicle are generally accustomed to seeing safety lights which stand out and are brighter than can be seen from such a low level and sometimes below the hull of the boat. In addition, the outboard motor gear drive housing and skeg protrude below the boat sometimes block the view of one of the tail lights. The relatively low level of trailer lights results in them not being readily noticed by a following driver. It is accordingly desirable to have a brighter tail light and brake light or lights positioned on the very back of the boat or on the outboard motor which is readily noticeable by a driver following the trailered boat. Placing a light on the back of the boat presents a problem in finding a place to mount the light while the boat is being trailered which can be removed for launching the boat.

The present invention provides a convenient removable tail light and brake light for a trailered boat which can be easily and quickly attached and removed from the skeg of the outboard motor.

Prior art U.S. patents can be seen in the Cribbs U.S. Pat. No. 5,613,886, for an outboard motor mounted safety light apparatus mounted to an outboard motor that is being towed by a trailer. The light is mounted to the outside housing or cowling of the outboard motor and may be connected to the trailer lights. In the Wengler U.S. Pat. No. 5,137,481, an outboard motor carrier or tote mounts over the housing of the outboard motor and has a pair of spaced apart straps that encircle the motor with a carrying handle formed of fabric. The outboard motor tote includes a post having a white navigation light attached to it. The Altimus U.S. Pat. No. 3,870,875, is a cover for covering the propeller and rear drive assembly of an outboard/inboard motor boat and has an electric tail light mounted to the rear of the cover which can be electrically connected to the tail light wire of a boat trailer. The Johannes U.S. Pat. No. 4,993,978, is an outboard motor signal made up of a plate-light member supported by U-shape springs on the outboard motor. Reflective tape is disposed on the outside of the plate-light member. The Chudzik U.S. Pat. No. 5,157,591, is an attachable auxiliary vehicle lighting system which can be selectively attached to the front or rear of a vehicle or a trailer or carrier attached to a vehicle or to an object attached to the vehicle trailer or carrier, such as a ladder, a boat, or a bicycle. The Rasinski U.S. Pat. No. 4,286,309, is a detachable vehicle lighting fixture for use with towed vehicles, such as boats and snowmobiles. The Whitley, Jr. U.S. Pat. No. 3,885,146, is an attachable tail light assembly for boat trailers.

The present invention is for a boat trailer lighting system which conveniently attaches to the skeg on an outboard motor of a boat being towed on a trailer and connects to the trailer lighting system to provide an easily attached and removed lighting assembly in a position that is easily seen by the driver of a vehicle following the trailered boat.

SUMMARY OF THE INVENTION

A boat trailer lighting system includes a boat trailer for trailering a boat having an outboard motor mounted thereto. An electrical light assembly has an electric lamp therein rotatably attached to an outboard motor skeg mounting bracket which is removably attached to the outboard motor skeg. The electrical light assembly is connected through an electrical conductor to an electrical power source which may be connected into the tail and brake lights of the trailer so that the light is activated along with the trailer lights. The outboard motor skeg mounting bracket has a cover sleeve of the general shape of the outboard motor skeg for sliding over the skeg and a threaded clamping bolt threaded through the cover against the skeg to lock the skeg light to the outboard motor.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
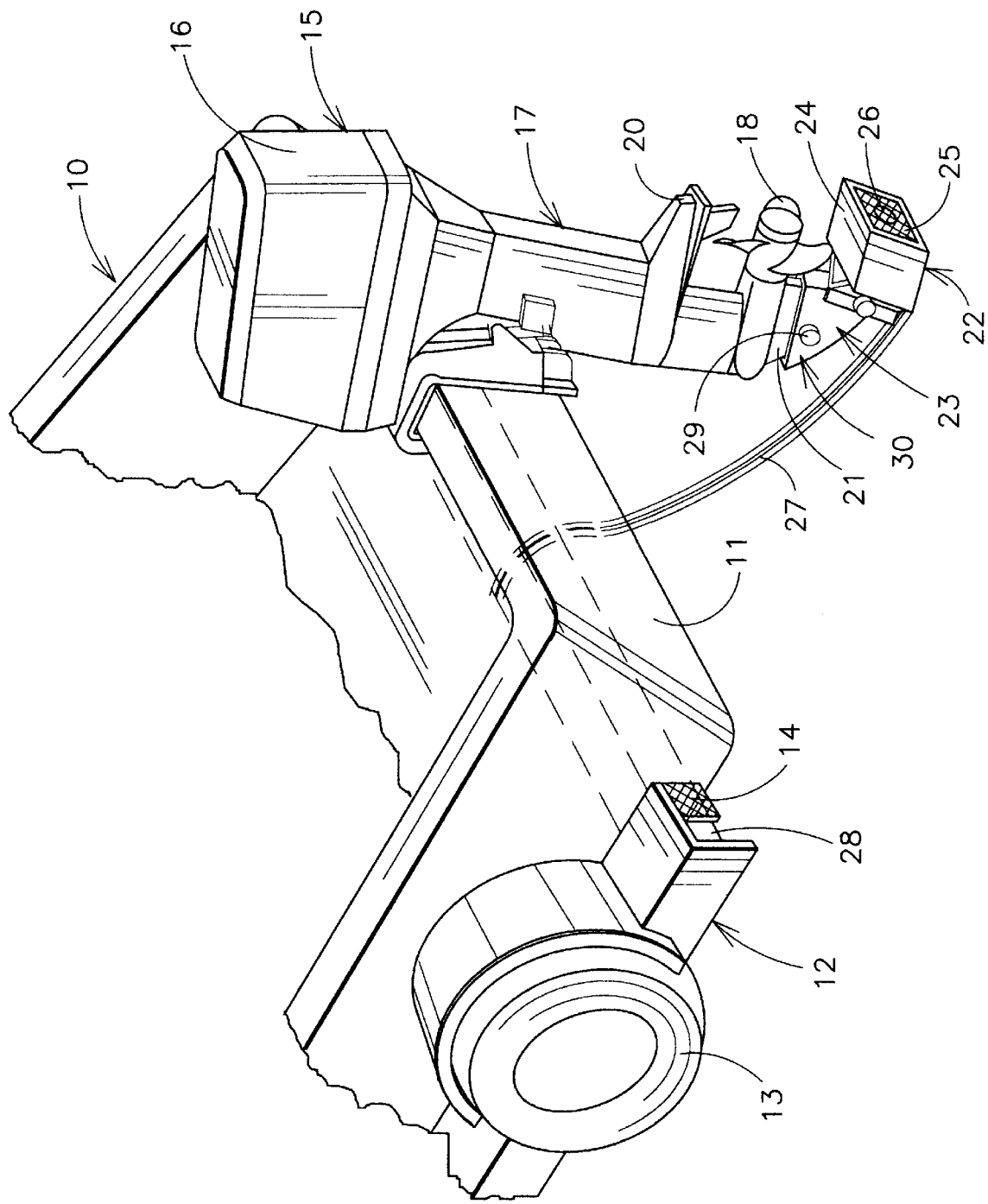
FIG. 1 is a partial perspective view of a trailered boat having an outboard motor attached thereto having a mounted light assembly in accordance with the present invention.
Figure 2:
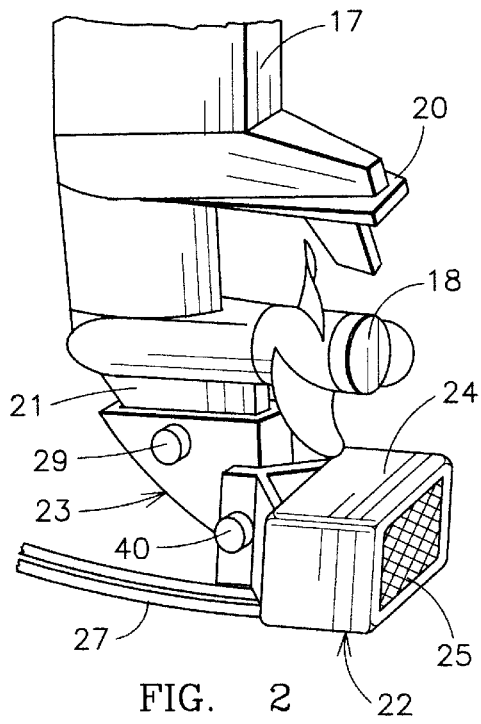
FIG. 2 is a perspective view of a bottom portion of the drive shaft housing and skeg of an outboard motor having the skeg light assembly of FIG. 2.
Figure 3:
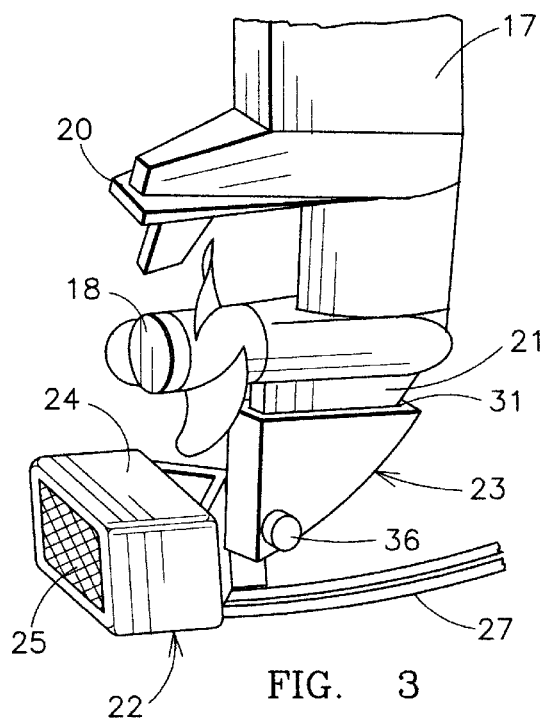
FIG. 3 is a perspective view of a skeg light assembly mounted to the skeg of an outboard motor in accordance with FIGS. 1 and 2.

Referring to FIGS. 1–5 of the drawings, a boat 10, shown in FIG. 1, has a transom 11 and is supported to a boat trailer 12 having wheels 13 and rear tail and brake lights 14. The boat 10 has an outboard motor 15 attached to the transom 11 while being towed on the trailer 12. The outboard motor 15 has a cowling 16 and a drive shaft housing 17 with a propeller 18 mounted thereto below an anti-cavitation plate 20. The prop has a skeg 21 extending directly below the drive shaft housing 17 behind and below the propeller 18. An electric light assembly 22 is mounted to an outboard skeg mounting bracket 23 which is mounted to the skeg 21. The lighting assembly 22 has a housing 24 and a lens 25 and has a lamp 26 mounted behind the lens 25. An electric conductor 27 connects to the lamp assembly 22 and operatively to the lamp 26. The conductor 27 extends underneath the rear of the boat 10 and over the frame 28 of the trailer 12 and is attached to the tail and brake light 14 of the trailer 12.

The skeg mounting bracket 23 has a covering sleeve 30 shaped similar to the skeg 21 and having the open area 31 so that the bracket sleeve 30 can be slid onto the skeg 21. The bracket is held to the skeg by a threaded fastener 29 which is threaded through one side 33 of the skeg mounting bracket sleeve 30 and against one side of the plate 19 which is driven against the skeg 21, as more clearly seen in FIG. 5. The plate 19 prevents the scratching of the skeg 21 and may be made of a hard rubber or other non-marring substance.

The light assembly 22 has the light assembly housing 34 with an attaching frame 35 extending from the rear thereof. A threaded bolt 36 passes through the light assembly attaching portion 35 and through an opening 37 through the skeg mounting bracket 23, wall 33 and wall 38. In this case, the bolt 36 has a threaded head 40 attached to one side which is tightened onto the bolt 36 to tightened the light assembly 22 in any desired position. The light assembly 22 can be rotated on the attaching bolt 36 to position the lens 25 and lamp 26 facing the rear of the trailer 12 and boat 10.

Figure 4:
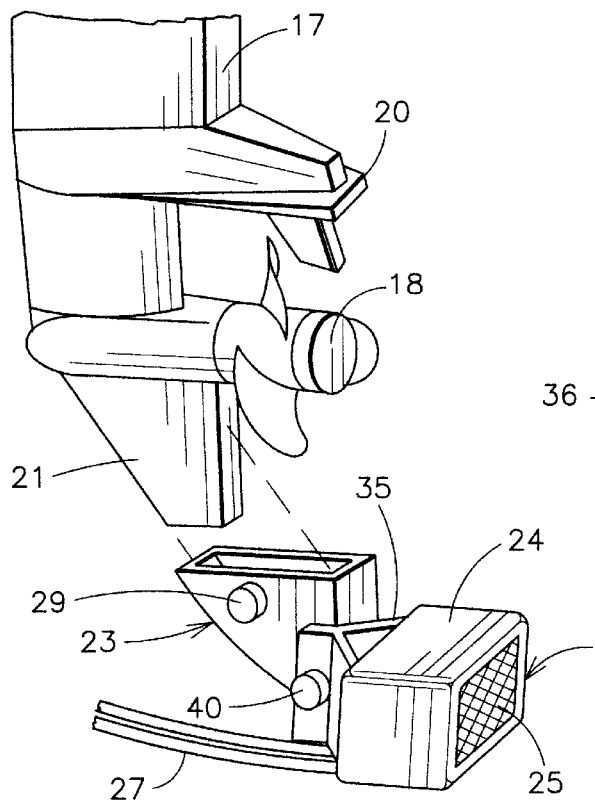
FIG. 4 is an exploded perspective view of the light assembly and outboard motor drive shaft housing of FIGS. 2 and 3.
Figure 5:
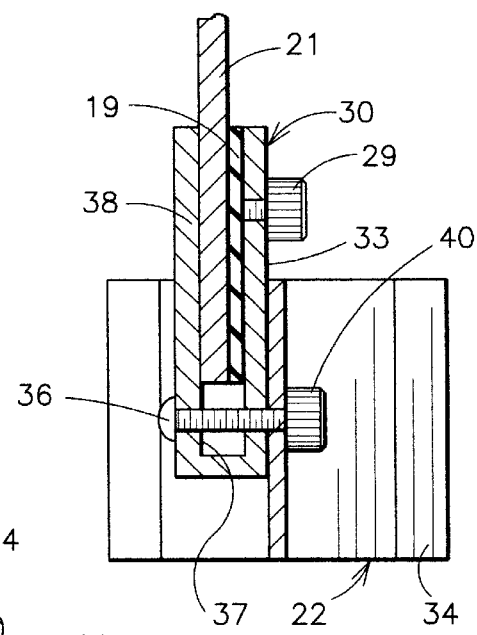
FIG. 5 is a sectional view taken through the skeg mounting bracket attached to the skeg of an outboard motor.

In operation, the attached light assembly 22 and skeg mounting bracket 23 are positioned, as shown in FIG. 4, to slide the skeg mounting bracket sleeve 30 over the skeg 21 of the outboard motor 15. The threaded bolt 29 is threaded into the wall 33 of the skeg bracket sleeve 30 to tighten the bolt 29 onto the plate 19 which is pressed against the skeg 21 to hold the skeg mounting bracket and attached lighting assembly 22 to the skeg of the outboard motor. The electric light assembly 22 can then be rotated to any desired position and the threaded nut 40 tightened to hold the light assembly 22 in position. The electrical conductor 27 is operatively connected to the trailer 12 light which can be accomplished by attaching the conductors directly to the conductors of the trailer tail lights.

It should be clear at this time that a boat lighting system has been provided which advantageously allows for additional lighting for the rear of a trailered boat and which places the light in a position which is easily seen by the driver of a vehicle following the trailered boat. The light can also be used on a trailered boat with twin outboards and can rapidly be attached and removed when the boat is launched. However, the present invention should not be construed as limited to the form shown which are to be considered illustrative rather than restrictive.

I claim:

1. A boat trailer lighting system comprising:
   a boat trailer for trailering a boat having an outboard motor mounted thereto, said outboard motor having a drive train housing having a skeg thereon;
   an outboard motor skeg mounting bracket removably attached to said outboard motor skeg; and
   an electrical light assembly rotatably attached to said outboard motor skeg mounting bracket and having an electrical lamp therein connected to an electrical power source, said electrical light assembly removably attached to said outboard motor skeg with said outboard motor skeg mounting bracket when said outboard motor mounted to said boat attached to said boat trailer.

2. A boat trailer lighting system in accordance with claim 1 in which outboard motor skeg mounting bracket includes a cover shaped to fit over said outboard motor skeg and having a threaded clamp attached therethrough for clamping onto said outboard motor skeg.

3. A boat trailer lighting system in accordance with claim 2 in which said light assembly has a yoke thereon fitting over a portion of said skeg cover and having a bolt member attaching through said yoke and skeg cover to rotatably attach said light assembly to said skeg mounting bracket.

4. A boat trailer lighting system in accordance with claim 3 in which said light assembly has a colored lens covering said electrical lamp.

5. A boat trailer lighting system in accordance with claim 4 in which said boat trailer has a brake light and said electrical lamp is operatively connected thereto.

6. A boat trailer lighting system in accordance with claim 5 in which an electrical conductor connects said electrical lamp to said trailer brake light.

* * * * *